May 12, 1942.   D. L. CAMPBELL   2,282,453
CATALYTIC REACTION APPARATUS
Filed Oct. 12, 1938

Donald L. Campbell Inventor
By J. K. Small Attorney

Patented May 12, 1942

2,282,453

UNITED STATES PATENT OFFICE 2,282,453

CATALYTIC REACTION APPARATUS

Donald L. Campbell, Elizabeth, N. J., assignor to Standard Oil Development Company, a corporation of Delaware Application October 12, 1938, Serial No. 234,555

2 Claims. (Cl. 196—124)

This invention relates to improvements in a reaction chamber in which finely-divided solids are agitated with vapors or liquids and more particularly in a reaction chamber for the (1) cracking of petroleum hydrocarbons with the aid of a finely-divided solid catalyst and (2) for the regeneration of the catalyst together with means for controlling the catalyst concentration.

An object of this invention is to provide an apparatus in which the fluid, whether in vapor or liquid phase, is intimately commingled with the finely-divided solid. Better mixing of these phases is obtained by the use of the invention than would result from the use of a drum with or without known means of agitation or in a tube of great length as compared with its diameter.

Another object of this invention is to provide an apparatus supplying a reaction space such that the fluid and finely-divided solid are agitated in successive zones without mixing the vapors in one stage of the process with those in a considerably later stage.

Another object of the invention is to provide an apparatus supplying reaction space such that the flow of fluid through the reactor does not involve any considerable pressure drop.

Another object of the invention is to provide an apparatus supplying reaction space in which the concentration of the finely-divided solid and the fluid can be controlled to some extent independently of the relative thruputs of solid and fluid, thereby controlling the time of contact of the finely-divided solid with the fluid.

Other characteristics and further advantages of this process will be noted on reading the following description with reference to the accompanying drawing.

Figure 2:
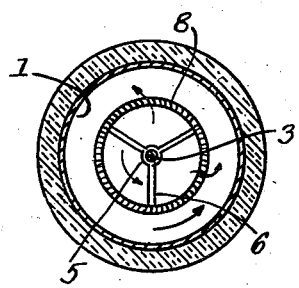
Fig. 2 is a cross section taken on line II—II of Fig. 1.
Figure 1:
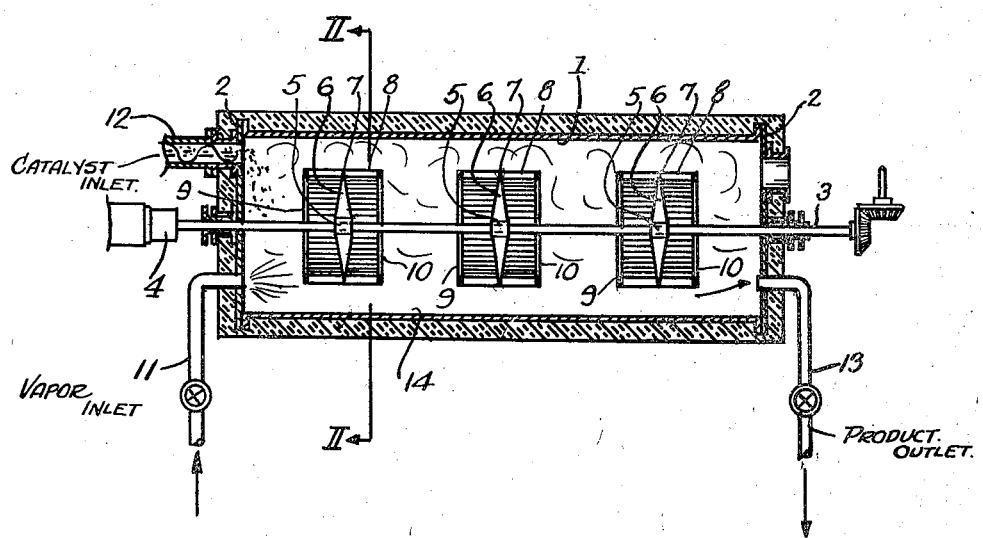
Fig. 1 is a diagrammatic elevation of a preferred form of the apparatus.

Referring to the drawing, numeral 1 indicates a heated or insulated cylinder with bolted-on heads 2 through which is passed a shaft 3 supported by external bearings 4. Rigidly mounted at spaced points along the shaft 3 are a plurality of collars 5 having spaced regularly extending arms 6 connected at their outer ends with annular rings 7.

Suitably secured to the annular rings 7 and extending in both directions therefrom are a plurality of blades 8 arranged in closely spaced relation and extending longitudinally of the reaction chamber. The outer ends of the blades 8 are secured in spaced relation by means of annular rings 9 and 10. Each of the blades 8 are ranged in pitched relation to the annular rings 7, 9 and 10 so that the outer ends of the blades extend forwardly in the direction of rotation.

The rotation of the blade assembly through the medium of the central shaft 3 causes an intimate dispersion or mixing of the powdered catalyst within the stream of vapors passing through the reaction chamber.

In the particular case of the cracking of petroleum hydrocarbons with the aid of a finely-divided solid catalyst, petroleum hydrocarbons that have been previously heated and vaporized are admitted to the reaction chamber with or without diluents through a pipe 11 at one end of the chamber. At another point in the same end of the chamber, preferably above the oil vapor inlet, there is admitted hot powdered catalyst, preferably through a screw conveyer 12. In case the mixture tends to coat the fans and chamber walls and to coagulate in lumps immediately upon entering the chamber, steam or other diluent is mixed with the catalyst in order to separate the particles from each other before they enter the chamber and thereby prevent coagulation.

The vapors and catalyst are intimately mixed by the recirculating streams of gas which enter either end of the fans, are caused to flow outward centrifugally by the action of the blades and complete the circuit by being thrown back toward the axis of the chamber by impact on the walls of the cylinder. The direction of recirculation may be alternately clockwise and counter-clockwise (fans all rotate in the same direction). The time of passage of the oil vapor (or air, in the case of regeneration) through the chamber is regulated by the flow of vapor and the size of the chamber. The time of contact of the catalyst with the vapors in the chamber is regulated by varying the concentration of the catalyst therein which is effected by varying the axial and longitudinal position of the end of the outlet pipe 13.

Stationary guide fans may be used to obtain a more perfect mixing and to guide the flow between the fans, but they are generally omitted in order to permit better access to the inside of the chamber when it requires cleaning.

At certain locations in the chamber, such as at 14, there will be relatively less agitation than in the main body of the chamber and the suspended solids will settle out until an equilibrium is reached, after which no further settling will occur. Coagulation of the settled particles will occur in some cases, the result being the formation of firm deposits in a relatively small part of the chamber which, however, will not interfere with the reaction going on in the main body of the chamber. In certain cases the chamber may be mounted horizontally in order to prevent the finely-divided solid from tending to drop from the inlet to the outlet without sufficient mixing with the fluid. In other cases it will be more advantageous to mount the chamber vertically in order to reduce the amount of deposition on the chamber walls.

As an alternative to the use of fans with openings through the central portion in the axial direction, fans may be used with a dividing partition at right angles to the axis of the fan. Such a partition in some cases improves the agitation inside the cylinder by causing the fluid and solid mixture entering the fan to be of two different rates on the two sides of the fan. The mixture leaving the fan would tend to divide more equally.

The use of several fans tends to agitate the vapors and catalyst in one stage of the cracking process without mixing in vapors in a much later stage of the process. If only one fan were used, the vapors throughout the whole chamber would be substantially of the same composition, that is, the composition of the products of the reactions. The disadvantage of this is that the charge stock is thereby diluted and its time of contact in the chamber reduced with consequent reduction in the desired reaction accomplished. Secondly, the concentration of the desired products is increased through the reactor thereby causing more "overcracking" or decomposition of the desired products into undesired products by undesirable reactions.

The fans are rotated at a sufficient speed to maintain a vapor velocity through the blades high enough to keep the powdered catalyst in suspension. The reactor is preferably of a large diameter so that the radius of curvature of the flowing streams of recirculating vapors is small and there is comparatively little tendency for centrifugal separation of vapors and catalyst to the extent of settling out the catalyst. However, the tendency to separation that does occur, resulting in regions of comparatively high and comparatively low catalyst concentration in the reactor, is utilized for regulatory purposes. Regardless of the variation in catalyst concentration through the reactor, the concentration of the outlet gas is determined by the relative rates of catalyst and vapor feed to the reactor. If the outlet pipe is in position so as to draw off vapors at the point of highest concentration in the chamber, this highest concentration will be the same as that determined above. All the other concentrations in the chamber will be lower, the average concentration will be low and the time of contact for the catalyst with the vapors will necessarily be low. In case the outlet pipe is positioned so as to withdraw from the point of lowest concentration, concentration throughout the reactor will be thereby increased and the time of contact correspondingly increased. The drive shaft 3, which is rotated by means not shown, may be used to indicate roughly the relative amount of catalyst in the mixture by measuring the power input to the driver of the fans. This power input will vary approximately according to the density of the catalyst and vapor mixture, provided that correction is made for the bearing friction.

In another specific application of the apparatus, spent catalyst from the cracking of petroleum hydrocarbons may be regenerated by being injected into the reaction chamber together with air, with or without recirculated products of combustion.

The invention is not to be limited to the specific embodiments or the specific examples given, nor to any theory advanced as to the operation of the invention, but in the appended claims it is intended to claim all inherent novelty in the invention as broadly as the prior art permits.

I claim:

1. An apparatus for the catalytic conversion of hydrocarbon oils which comprises an elongated reaction chamber, means for introducing oil vapors to be converted and a conversion catalyst into one end of said reaction chamber, means at the opposite end of said reaction chamber for withdrawing conversion products and catalyst, a rotatable shaft extending longitudinally through said reaction chamber, a plurality of sets of radial arms rigidly mounted on said shaft at spaced points therealong, a fan consisting of a wheel with a plurality of spaced blades secured to each set of said radial arms arranged at closely spaced points circumferentially of the reaction chamber and extending longitudinally thereof, said blades being pitched in the direction of rotation of said shaft to thereby maintain said catalyst particles dispersed within said hydrocarbon vapors.

2. An apparatus for the catalytic cracking of hydrocarbon oils which comprises an elongated horizontal reaction chamber, inlet for introducing the oil vapors to be cracked and finely divided catalyst into one end of said reaction chamber, outlet for withdrawing cracked products and catalyst from the opposite end of said reaction chamber, a rotatable shaft extending longitudinally through said reaction chamber, a plurality of sets of radial arms rigidly mounted on said shaft at spaced points therealong, a fan consisting of a wheel with a plurality of spaced blades secured to each set of said radial arms, said blades being pitched in the direction of rotation of said shaft to thereby disperse said finely divided catalyst in the oil vapors to be cracked.

DONALD L. CAMPBELL.